(12) United States Patent
Imamura et al.

(10) Patent No.: US 6,696,782 B2
(45) Date of Patent: Feb. 24, 2004

(54) GREEN-EMITTING PHOSPHOR AND IMAGE DISPLAY DEVICE USING THE SAME

(75) Inventors: Shin Imamura, Kokubunji (JP); Masatoshi Shiiki, Musashimurayama (JP); Hiromichi Yamada, Hino (JP); Masaaki Komatsu, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 97 days.

(21) Appl. No.: 09/811,438

(22) Filed: Mar. 20, 2001

(65) Prior Publication Data

US 2002/0063511 A1 May 30, 2002

(30) Foreign Application Priority Data

Oct. 12, 2000 (JP) ........................................ 2000-316853

(51) Int. Cl.[7] .............................. H01J 1/62; H01J 29/10; H01J 17/49
(52) U.S. Cl. ...................... 313/486; 313/496; 313/467; 313/582; 313/468; 313/487; 252/301.4 R; 252/301.6 R
(58) Field of Search ................ 252/301.4 P, 301.6 P, 252/301.4 F, 301.4 R, 301.6 R, 301.6 F; 313/467, 468, 495, 486

(56) References Cited

U.S. PATENT DOCUMENTS

| | | | | |
|---|---|---|---|---|
| 4,093,890 A | * | 6/1978 | Verriet et al. | 252/301.4 F |
| 4,180,477 A | * | 12/1979 | Barnes | 252/301.4 R |
| 4,755,715 A | * | 7/1988 | Berkstresser et al. | 252/301.4 R |
| 4,924,139 A | * | 5/1990 | Morita et al. | 252/301.4 R |
| 5,177,401 A | * | 1/1993 | Matsukiyo et al. | 252/301.4 F |
| 5,701,054 A | * | 12/1997 | Park et al. | 313/467 |
| 5,707,549 A | * | 1/1998 | Matsukiyo et al. | 252/301.4 R |
| 5,714,835 A | * | 2/1998 | Zachau et al. | 252/301.4 P |
| 6,013,983 A | * | 1/2000 | Asano et al. | 313/112 |
| 6,052,160 A | * | 4/2000 | Bohmer et al. | 349/32 |
| 6,094,001 A | * | 7/2000 | Xie | 313/309 |
| 6,458,295 B1 | * | 10/2002 | Yamada et al. | 252/301.4 R |

FOREIGN PATENT DOCUMENTS

JP 04046988 A * 2/1992 ........... C09K/11/80

* cited by examiner

*Primary Examiner*—Nimeshkumar D. Patel
*Assistant Examiner*—German Colón
(74) *Attorney, Agent, or Firm*—Antonelli, Terry, Stout & Kraus, LLP

(57) ABSTRACT

Green-emitting phosphor having a composition formula represented by $(Y_{1-x-a}Gd_xM_a)_{3-3y}Tb_{3y}(Al_{1-z}Ga_z)_5O_{12}$, where $0<x \leq 1$, $0 \leq a<1$, $0<x+a \leq 1$, $0<y<1$ and $0 \leq z \leq 1$ and M is at least one of Sc, Yb and La, improves emission color of phosphors of $Y_3(Al, Ga)_5O_{12}$:Tb series, and in case that $y=0.07$, $z=0.4$ and $a=0$ in the foregoing composition, color y is increased with increasing Gd concentration, when Gd concentration x is changed, and the emission color becomes clear green.

22 Claims, 13 Drawing Sheets

GREEN-EMITTING PHOSPHOR AND IMAGE DISPLAY DEVICE USING THE SAME

BACKGROUND OF THE INVENTION

The present invention relates to a green-emitting phosphor suitable for high quality image display and an image display device using the same.

The image display device using cathode ray tubes, etc. to display color images is advancing toward higher density and higher luminance by recent ever-increasing needs, where the image display device means a device per se for displaying image information by emission caused by exciting a phosphor by electron beam irradiation or ultraviolet ray, for example, a cathode ray tube (particularly projection type cathode ray tube), a low acceleration electron beam display panel [field emitter display (FED) etc.] a plasma display panel (PDP), etc., and also a system for displaying images, using said tube or panel as a display part or upon further incorporation of a driving device, an image processing circuit, etc.

Due to the reduction in beam spot diameter and the increase in scanning speed and excitation intensity of an electron beam etc. to attain higher density and higher luminance, the image display device has suffered from considerable occurrence of after-image caused by luminance saturation, luminance degradation, and afterglow, and the resulting image degradation has been a problem. At the same time, color, emission with a good color reproducibility has been also required. Therefore, improvement in luminance saturation property, luminance degradation resistance, afterglow property and color emission of phosphors is now keenly desired.

Explanation will be made below mainly of projection type cathode ray tube, which will be hereinafter referred to as "projection tube", among images display devices. Luminance of a projection tube is controlled by a current level for generating excitation electron beam, and thus it is necessary that the luminance of the phosphor can be linearly increased with increasing current level, but generally the phosphor suffers from such a phenomenon as luminance saturation with increasing excitation intensities of electron beam, resulting in loss of luminance linearity. When images are displayed with higher excitation intensities, degradation of phosphor materials becomes so considerable that luminance and color emission will be degraded while used.

Luminance saturation property and luminance degradation resistance depend largely upon species of phosphor materials process, additives, composition, etc. Heretofore, selection of phosphors having better properties and improvement of composition and process have been made to improve these properties, but no single phosphor materials fully satisfying all the properties as required have been obtained yet.

Green-emitting phosphor occupies 70% luminance on a white screen, and thus its improvement is important. Materials so far used as green-emitting phosphor for the projection tube include, for example phosphors of $Zn_2SiO_4$:Mn series, $Gd_2O_2S$:Tb series, ZnS:Cu, Al series, $Y_2SiO_5$:Tb series, $Y_3$ (Al, $Ga)_5O_{12}$:Tb series. etc.

Phosphors of $Gd_2O_2S$:Tb series with a good emission efficiency in the low-current level region have a low luminance in the high-current level region and cannot be used with an electron beam of high excitation intensity. Phosphors of $Zn_2SiO_4$:Mn series and ZnS:Cu, Al series have a high luminance saturation in the high-current level region, but when such phosphors are used in a projection tube, luminance of the projection tube will be lowered. Luminance degradation by electron beam takes place Vigorously and the life of the projection tube is considerably shorter. Phosphors of $Y_2SiO_5$:Tb series have a high luminance in the high-current level region, but a low luminance in the low-current level region, and luminance degradation by electron beam is considerable.

To improve these disadvantages, it is known to use phosphors of $Y_3$ (Al, $Ga)_5O_{12}$; Tb series with a high luminance, a low luminance degradation and a low luminance saturation, but color emission of such phosphors is yellowish with a poor color reproducibility and thus such phosphor cannot be used alone in the image display device, as disclosed, for example, in JP-A-59-49279.

BRIEF SUMMARY OF THE INVENTION

An object of the present invention is to improve color emission of green-emitting phosphors of $Y_3$(Al, $Ga)_5O_{12}$:Tb series.

The present invention provides a green-emitting phosphor having a composition formula represented by $(Y_{1-x-z}Gd_x M_a)_{3-3y}Tb_{3y} (Al_{1-z}, Ga_z)_5O_{12}$, where $0 < x \leq 1$, $0 \leq a < 1$, $0 < x + a \leq 1$, $0 < y < 1$ and $0 \leq z \leq 1$, and M is at least one of Sc, Yb and La.

Furthermore, the present invention provides an image display device using such a green-emitting phosphor.

BRIEF DESCRIPTION OF THE DRAWINGS

In FIGS. 1 to 21, reference numerals denote as follows: 1: face place, 2: fluorescent film, 3: metal back, 4: electron gun, 5: red image projection tube, 6: green image projection tube, 7: blue image projection tube, 8: projection screen, 9: projection lens system, 10: phosphor, 11: partition wall, 12: address electrode, 13: back glass substrate, 14: front glass substrate, 15: dielectric layer, 16: protective film MgO, 17: display electrode, 18: green-emitting phosphor layer, 19: red-emitting phosphor layer, 20: blue-emitting phosphor layer, 21: face plate, 22: fluorescent film, 23: rear plate, 24: cathode, 25: resistor film, 26: insulation film, 27: gate, 28: conical metal, and 29: FED type electron source.

DETAILED DESCRIPTION OF THE INVENTION

Figure 1:
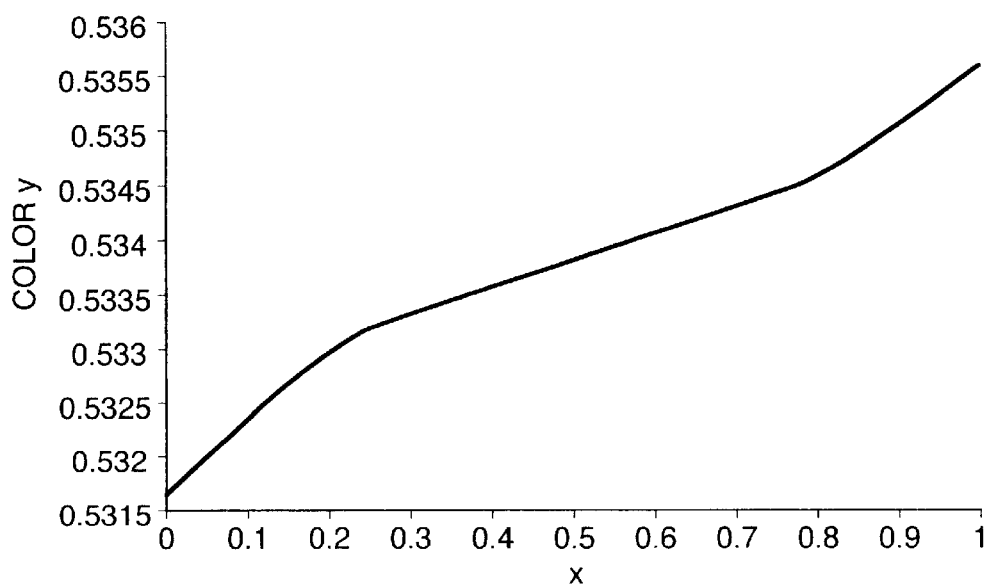
FIG. 1 is a diagram showing relations between Gd concentration x and color y of the present phosphors shown in Example 1.

Projection tube displays images by projecting images displayed by a cathode ray tube upon enlargement to a several tenfold area through an optical system and thus requires a ten to hundred-fold current level for excitation, as compared with a direct viewing cathode ray tube where unenlarged images are to be viewed. That is, the phosphors for the projection tube require a lower luminance saturation and less luminance degradation in a high current level range. Taking the foregoing requirements into consideration, the present inventors have made every effort to improve green-emitting phosphor and have successfully accomplished the present invention.

When the conventional matrix of $Y_3(Al_{1-z}Ga_z)_5O_{12}$ (sample used a prior art) is activated by Tb, the emission spectra has, besides emission approximately at 540 nm, which is a green emission, a large emission approximately at 490 nm, thereby worsening desired color emission, but the emission approximately at 490 nm can be reduced by adding Gd to the matrix, thereby improving color emission.

Generally, color emission of a phosphor can be expressed by using a C.I.E. color diagram. When green-emitting phosphors have the same level of color x, the higher the level of color y, the nearer to pure green, i.e. the better the color reproducibility and the color emission.

Therefore, the quality of color emission will be hereinafter judged by comparison of level of color y. In the image display device, it is recognized that the color reproducibility is improved, if the level of color y is increased by at least 0.0005. The present phosphor has a higher level of color y by about 0.005 maximum, than that of the conventional phosphors, thus showing better color emission.

Furthermore, the present phosphor has substantially the same levels of luminance and luminance saturation as those of the conventional phosphors and thus has properties as good as those of the conventional phosphors of $Y_3(Al, Ga)_5O_{12}$:Tb series.

Luminance degradation is evaluated by an acceleration test. That is, a phosphor sample is heated to 350° C. and irradiated with an electron beam at a higher current density (1,250 $\mu A/cm^2$), e.g. several tens times higher than that usually used. A ratio of emission luminance of the tested phosphor sample after held in that state for 30 minutes to the initial emission luminance is defined as a luminance maintenance factor, which will be used as an evaluation standard of the luminance degradation. The conventional phosphors have a luminance maintenance factor of 0.70, whereas the present phosphors have a luminance factor as high as 0.85.

Furthermore, the luminance degradation resistance can be improved by adding at least one of Sc, Yb and La to the matrix. For example, the luminance maintenance factor of the present phosphors can be increased to 0.90 from 0.85 by adding $2 \times 10^{-3}$ mole of Sc per mole of phosphor composition.

Still furthermore, the color emission of the present phosphors can be improved by mixing the present phosphors with at least one of phosphors of $Zn_2SiO_4$: Mn, $Y_2SiO_5$:Tb, LaOCe:Tb and $InBo_3$:Tb. However good luminance property and luminance degradation resistance of the present phosphors cannot be fully attained, when mixed with too large an amount of the additive phosphors. Thus, a mixing ratio of the additive phosphors is desirably not more than 40 wt. %.

Still furthermore, the decay time of a phosphor to be used in an image display device is an important factor in determining the image quality thereof. Even after discontinuation of irradiation with a phosphor-exciting electron beam, emission of the phosphor does not disappear completely, but disappears according to the attenuation rate proper to the phosphor. This is called "afterglow of a phosphor". When the afterglow disappearance time is long, an image previously displayed will remain as an after-image during the image displaying on the screen, rendering the images disagreeable.

Generally, this property is evaluated in terms of time until the luminance is decreased to one tenth of the emission luminance of irradiated phosphor after the discontinuation of irradiation with an electron beam, where such time is called "decay time $\tau_{10\%}$" as a measure of afterglow property of a phosphor. The standard evaluation method is disclosed in EIAJ code, where in case of a cathode ray tube the decay time is determined by intermittently irradiating a fluorescent film with a cathode ray tube and measuring attenuation of luminance after the discontinuation of irradiation with the cathode ray. In an image display device, the after-image is hardly observed, so long as $\tau_{10\%}$ of a phosphor is not more than 5.7 ms, and a good image quality can be obtained. $\tau_{10\%}$ of the conventional phosphor of $Y_3(Al, Ga)_5O_{12}$:Th series is about 6 ms, whereas $\tau_{10\%}$ of the present phosphor is decreased to about 4 ms as the shortest and a desirable decay time can be obtained.

As described above, the present phosphors can have good properties by adding Gd to the matrix. When the Gd concentration is adjusted in the above-mentioned composition so that x may be in a range of $0.1 \leq x \leq 1$, which is a more preferable composition of the present invention, level of color y will be by at least 0.005 higher and decay time $\tau_{100\%}$ will be not more than 5.7 ms as compared with the conventional phosphors, and thus better color emission and shorter decay time can be obtained and also better luminance maintenance factor can be obtained.

Still furthermore, the concentration of Tb as an activator is important in the luminance. When the concentration of Tb is adjusted to that y may be in a range of $0.03 \leq y \leq 0.3$, better luminance can be obtained.

Still furthermore, a higher emission luminance can be obtained by addition of Ga together with Al. When a ratio of Al to Ga is adjusted so that z may be in a range of $0.2 \leq z \leq 0.8$, better luminance can be obtained.

The state of the present phosphors is not particularly limited. Either single crystal or polycrystal can be used. Any form such as a sintered form, a powdery form, etc. can be used. In case of emission by electron beam excitation as in the cathode ray tube, etc., powders obtained by high temperature reaction of raw materials upon addition of flux, etc. thereto are preferably used, where powders having particle sizes of about 1 $\mu$m are more preferably used.

Phosphors having the same parent structure as that of the present phosphors and having compositions similar to these of the present phosphors are disclosed is JP-B-54-34710, JP-B-52-3627 and JP-A-10-140150. The present invention differs from JP-B-54-3470 in that some of elements O is replaced with element S to improve the luminance, differs from JP-B-52-3627 in that the prior art reference relates to a yellow phosphor for use in film-reading flying spot tubes and element Ce is used as an activator, differs from JP-A-10-140150 in that the conductivity is improved by lowering the concentration of element O. Furthermore, practical application of these prior art phosphors is quite difficult because of a failure to obtain satisfactory crystallinity of these phosphors because of their preparation procedures. That is, barium fluoride has so far often been used as a flux capable of promoting crystal growth when such phosphors having a garnet crystal structure as these prior art phosphors are to be fired. Indeed, barium fluoride is used even for the synthesis of these prior art phosphors. Even if barium fluoride is used for the synthesis of the present phosphors, no phosphors of satisfactory crystallinity can be obtained. In the synthesis of the present phosphors, on the other hand, potassium sulfate is used as a flux to obtain satisfactory crystallinity. Besides potassium sulfate, sodium tetraborate ($Na_2B_4O_7$) strontium fluoride ($SrF_2$), yttrium fluoride ($YF_2$), aluminum fluoride ($AlF_3$), magnesium fluoride ($MgF_2$), calcium fluoride ($CaF_2$), barium chloride ($BaCl_2$), etc. can be used in the present invention as a flux. An image display6 device having a good image quality can be manufactured by using a fluorescent film containing the present phosphor as a practical mode of the present phosphor.

An example of a projection type display device will be explained below. The projection type display device comprises three projection tubes of three colors RBG. An image display device with a good green emission, a long life, a short decay time and a good image quality can be manufactured by using the present phosphor alone or a green-emitting phosphor mixture containing the present phosphor as a phosphor to be applied to the face plate of a green image projection tube.

The present invention can be used most suitably for phosphors for projection tube, because of particularly distinguished luminance saturation at excitation by high level of electric current and luminance degradation resistance.

Furthermore, in the field of a direct viewing cathode ray tube (which will be hereinafter referred to as "direct viewing tube"), an image display device with a good green emission, a long life, a short decay time and a good image quality can be manufactured by using the present phosphor alone or in mixture with other phosphor as a green-emitting phosphor which is one member of the phosphors of three colors to be applied to the face plate.

Still furthermore, when a fluorescent film containing the present phosphor is used in an image display device using a low speed electron beam, for example, a field emitter display (FED), etc., an image display device with a good green emission, a long life, a short decay time and a good image quality can be manufactured.

Still furthermore, when a fluorescent film containing the present phosphor is used in an image display device capable of emission caused by ultraviolet irradiation, for example, a plasma display panel (PDP), etc., an image display device with a good green emission, a long life, a short decay time and a good image quality can be manufactured.

The present invention will be described in detail below, referring to Examples and Drawings.

EXAMPLE 1

$Y_2O_3$, $Gd_2O_3$, $Tb_4O_7$, $Al_2O_3$ and $Ga_2O_3$ were used as raw materials for preparing a phosphor. Predetermined amounts of these raw materials according to stoichiometric ratios thereof were admixed with 1/20 mole of $K_2SO_4$ as a flux for firing per mole of the fired product of the raw materials, followed by thorough mixing in a mortar. The resulting mixture was placed in an aluminum crucible, and, after placing of a lid on the crucible, the mixture was fired at 1,600° C. for two hours. The resulting fired product was pulverized, washed with water to remove the flux component therefrom, and dried, whereby phosphor powders having particle sizes of about 8 $\mu$m were obtained.

In this manner, a green-emitting phosphor having a composition formula represented by $(Y_{1-x}Gd_x)_{3-3y}Tb_{3y}(Al_{1-z}Ga_z)_5O_{12}$ was obtained, where $0<x \leq 1$, $0<y<1$ and $0 \leq z \leq 1$. For comparison the conventional phosphor with x=0 was also prepared.

To determine the emission property by cathode ray, fluorescent films having a film weight of about 5 mg/cm$^2$ were formed on copper substrates from these samples by sedimentation in water, respectively. The fluorescent films were irradiated with an electron beam at a current density ranging from 0.1 to 1,250 $\mu$A/cm$^2$ in vacuum at a vacuum degree of not less than 7×10$^{-6}$ Pa to determine a luminance property, a luminance degradation resistance and an decay time.

Luminance property was determined by a phototransistor made of Si placed at a position by 20 cm far from the film surface. For luminance degradation resistance, a luminance maintenance factor, which was defined by a ratio to an initial luminance of an emission luminance after being held for 30 minutes following increasing the temperature of a phosphor sample to 350° C. and irradiation with an electron beam at a high current density (1,250 $\mu$A/cm$^2$) several ten times, which was as high as the practically usually used current density, was used as an evaluation standard.

For color emission, color y was measured by a chromaticity meter placed at a position by 30 cm far from the fluorescent film surface. Procedure for determination of an decay time in this Example was the same procedure as given in EIAJ code. A fluorescent film was excited by intermittent irradiation with an electron beam, while applying thereto pulses as signals to a cathode ray tube in such a state that the electron beam may not be deflected, i.e. in such a state that the cathode ray may be focussed to one point, where changes in emission from the fluorescent film were measured in time course and the state of luminance attenuation from the time of discontinuation of irradiation with the electron beam was investigated. Time when the luminance reached one tenth of the luminance during the irradiation with the electron beam was defined as decay time $\tau_{10\%}$, which was a value expressing the afterglow property. Electric current used for generating the electron beam was 100 $\mu$A, pulse width 0.5 $\mu$s and pulse interval 100 ms.

FIG. 1 is a diagram of color y of the present phosphor determined under electron beam excitation at a current density of 10 $\mu$A/cm$^2$ when a Gd concentration x was changed in a range between 0 and 1 at y=0.07 and z=0.4 in the foregoing phosphor composition formula. The conventional phosphor corresponded to x=0. With increasing x, the color y was increased, showing good green emission. Particularly in a range of $0.1 \leq x \leq 1$, the color y was by at least 0.005 higher than that of the conventional phosphor, showing good green emission.

Figure 2:
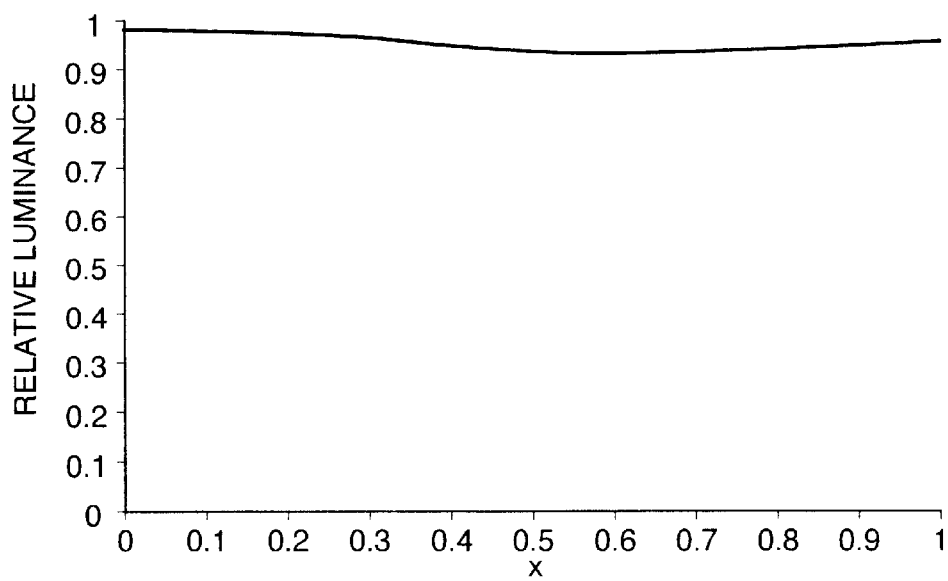
FIG. 2 is a diagram showing relations between Gd concentration x and relative luminance of the present phosphors shown in Example 1.

FIG. 2 shows relative luminance of the present phosphor when x was changed between 0 and 1 as above to luminance of the conventional phosphor (x=0) as unity (1) determined under electron beam excitation at a current density of 10 $\mu$A/cm$^2$. As is apparent from FIG. 2, substantially equal luminance to that of the now available phosphors i.e. relative luminance of 0.9 or higher can be obtained in all the range of x. Thus, the present phosphor can be practically used with good satisfaction.

Figure 3:
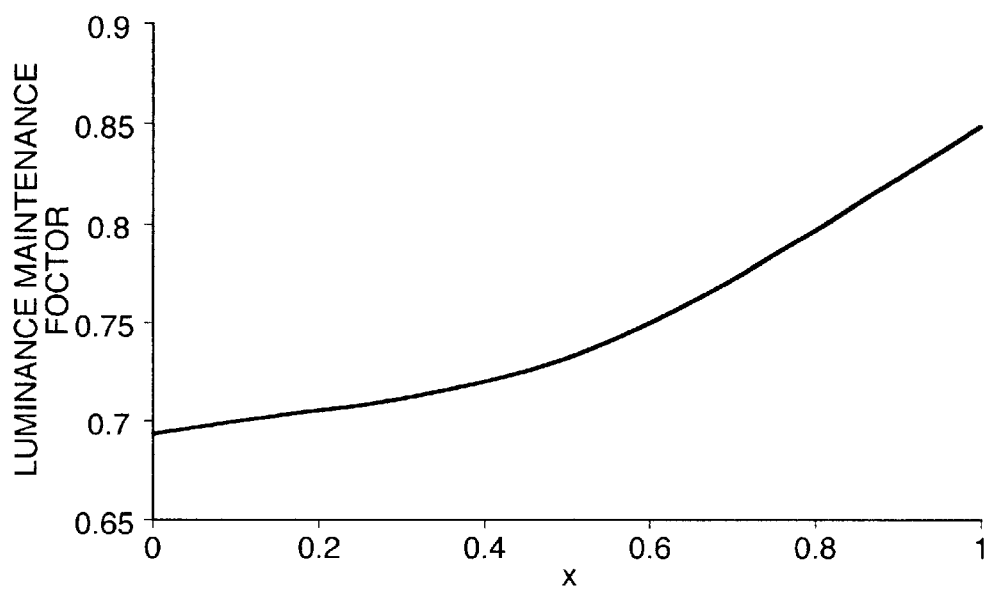
FIG. 3 is a diagram showing relations between Gd concetration x and luminance maintenance factor of the present phosphor shown in Example 1.

FIG. 3 is a diagram of luminance maintenance factor of the present phosphor, determined under electron beam excitation at a current density of 10 mA/cm$^2$ when x was changed between 0 and 1 as above. With increasing x the luminance maintenance factor increased, showing an improvement of luminance degradation resistance. Particularly, better luminance degradation resistance was obtained when x was in a range of 0.2 to 1.

Figure 4:
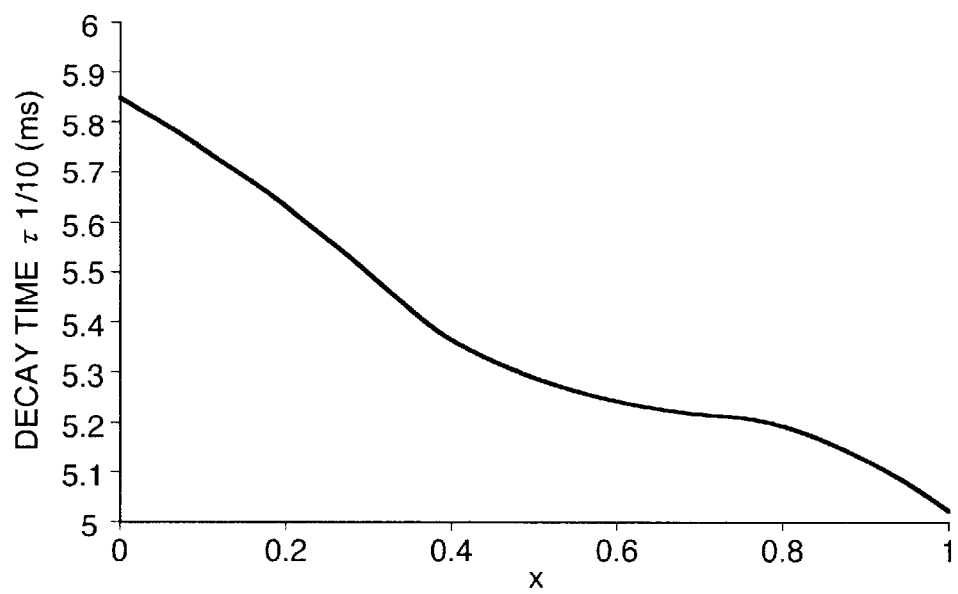
FIG. 4 is a diagram showing relations between Gd concentration x and decay time of the present phosphors shown in Example 1.

FIG. 4 shows decay time $\tau_{10\%}$ when x was changed between 0 and 1 as above. With increasing x, the decay time was shortened, showing improvement of decay time. Particularly when x was in a range of $0.1 \leq x \leq 1$, the decay time $\tau_{10\%}$ became shorter than 5.7 ms, showing that considerably shorter decay time was obtained.

Figure 5:
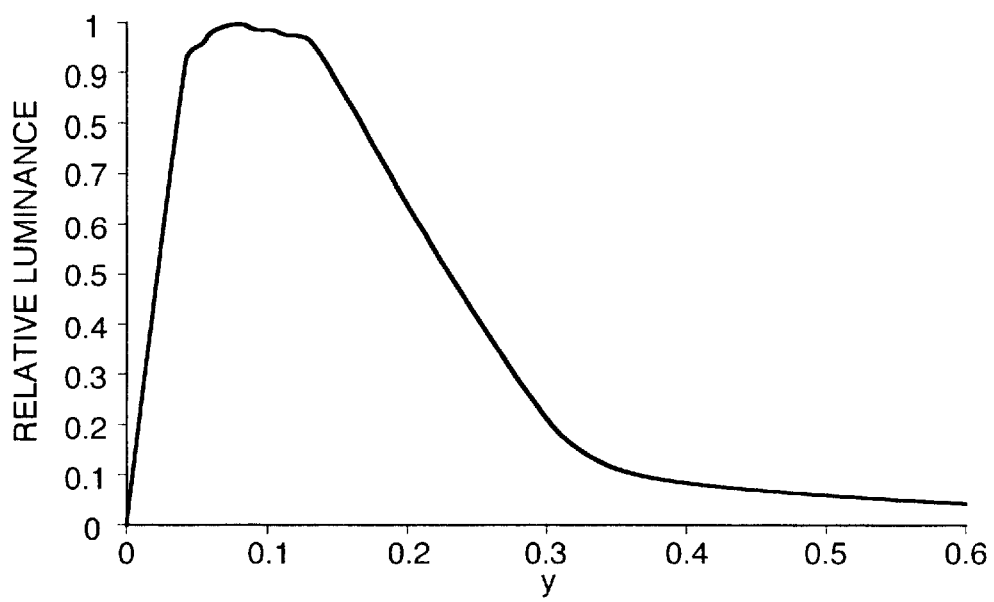
FIG. 5 is a diagram showing relations between Tb concentration y and relative luminance of the present phosphors shown in Example 1.

FIG. 5 shows relative luminance of the present phosphor of the above-mentioned composition formula, where z=0.4 and when Tb concentration y was changed from 0 to 0.5 in case of a ratio of Y concentration to Gd concentration=1:1 (i.e. in case that relations between Gd concentration x and Tb concentration Y can be expressed by an equation x=(1-y)/2) to luminance of the conventional phosphor (y=0.07) as unity (1), determined under electron beam excitation at a current density of 10 $\mu$A/cm$^2$. It is apparent therefrom that at y=about 0.07 and in a range of $0.03 \leq y \leq 0.3$ practically applicable high luminance can be obtained.

Figure 6:
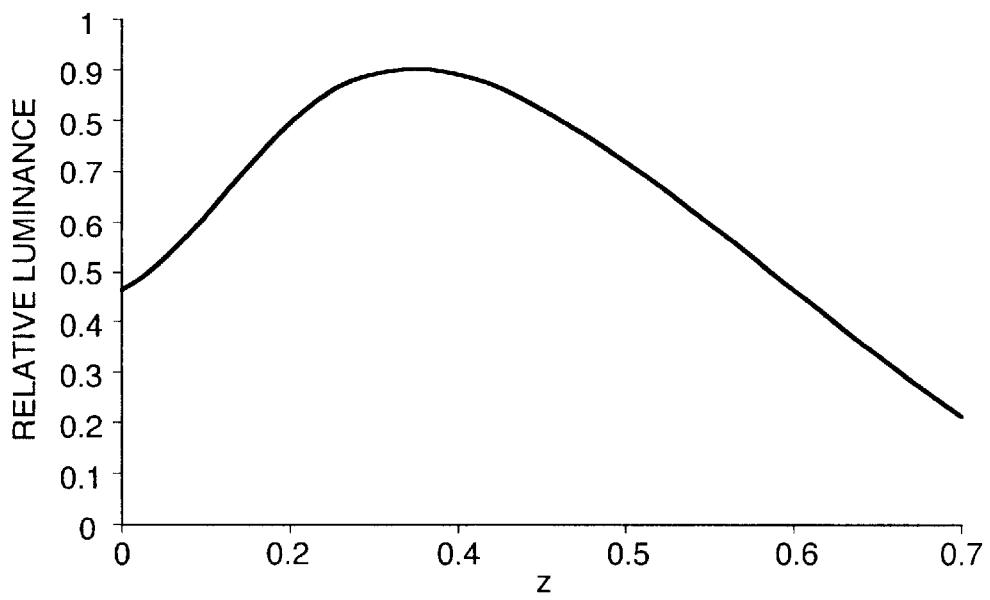
FIG. 6 is a diagram showing relations between Ga concentration z and relative luminance of the present phosphors shown in Example 1.

FIG. 6 shows relative luminance of the present phosphor of the above-mentioned composition formula, where x=0.5 and y=0.07, when the Ga concentration was changed between 0 and 1 to luminance of the conventional phosphor (z=0.4) as unity (1), determined under electron beam excitation at a current density of 10 $\mu$A/cm$^2$.

It is apparent therefrom that in a range of $0.2 \leq z \leq 0.8$ practically applicable high luminance can be obtained.

In the present invention, particularly at Y concentration=0 color y and decay time $\tau_{10\%}$ become best. Therefore, luminance and decay time particularly at Y concentration=0, that is in case that Gd concentration x can be given by Tb concentration y through equation x=1−y have been further studied as shown below.

Figure 7:
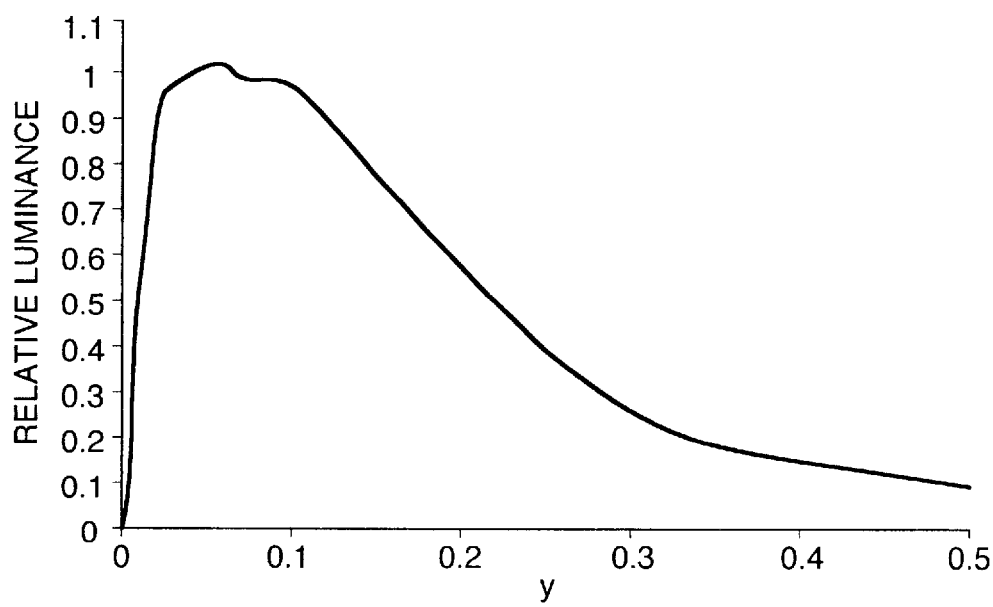
FIG. 7 is a diagram showing relations between Tb concentration y and relative luminance of the present phosphors at zero Y concentrations shown in FIG. 1.

FIG. 7 shows relative luminance of the present phosphor of the above-mentioned composition formula, where z=0.4, Y concentration=0 and Gd concentration x was given by an equation x=1−y, when Tb concentration was changed from 0 to 0.5 to luminance of the conventional phosphor (x=0.5 and y=0.07) as unity (1), determined under electron beam excitation at a current density of 10 $\mu$A/cm$^2$. It is apparent therefrom that a maximum relative luminance is around y=0.05 and practically applicable high luminance can be obtained in a range of $0.03 \leq y \leq 0.3$.

Figure 8:
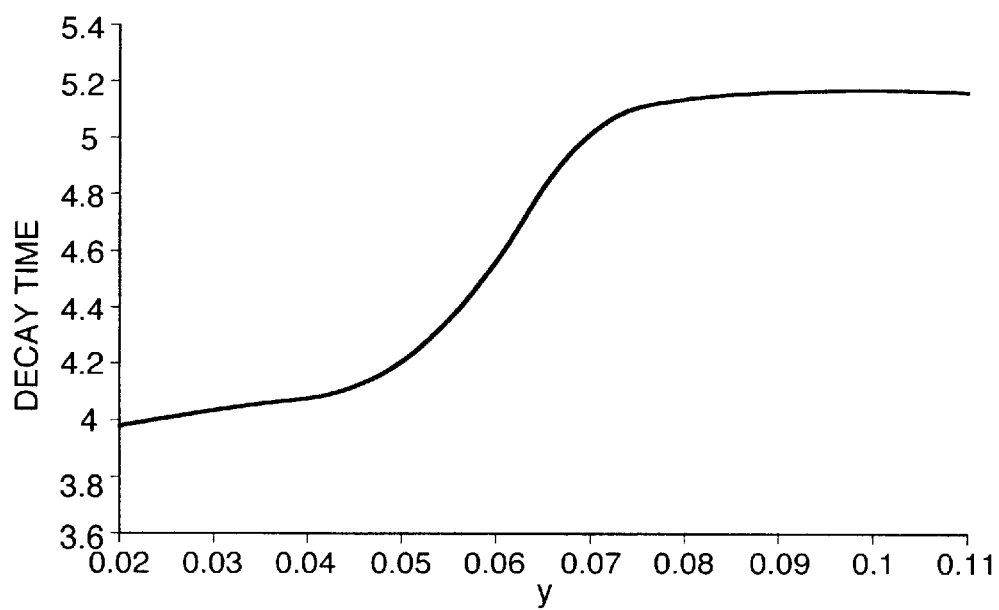
FIG. 8 is a diagram showing relations between Tb concentration y and decay time of the present phosphors at zero Y concentration shown in Example 1.

FIG. 8 shows decay time $\tau_{10\%}$ determined by the aforementioned procedure when Tb concentration y was changed from 0.02 to 0.11 under the same conditions as above. In all the range of y, $\tau_{10\%}$ was below 5.3 ms, showing a good decay time.

Figure 9:
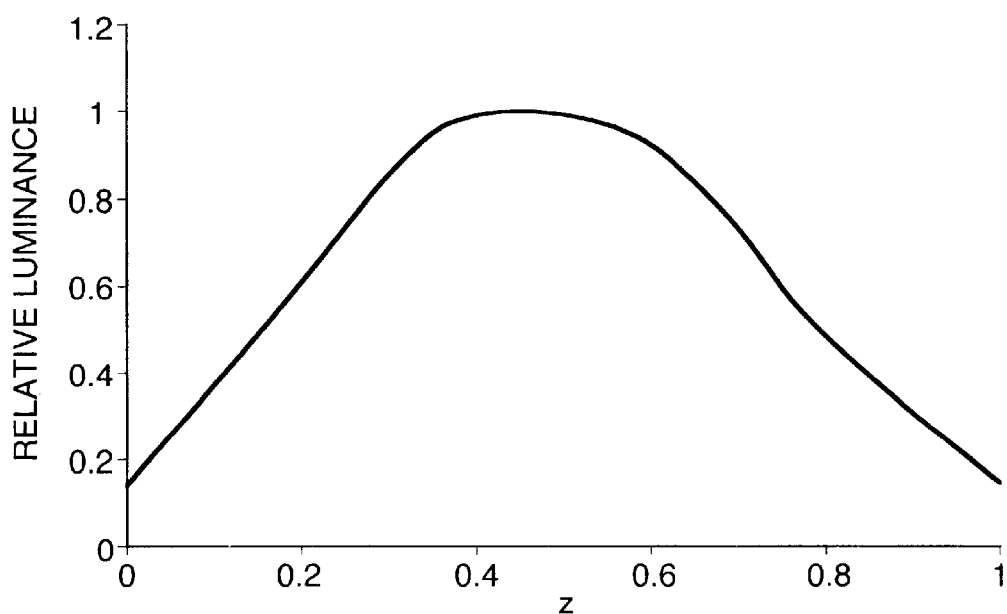
FIG. 9 is a diagram showing relations between Ga concentration z and relative luminance of the present phosphors at zero Y concentration shown in Example 1.

FIG. 9 shows relative luminance of the present phosphor, where, at Y concentration=0, x=1 and y=0.07 as above, when Ga concentration z was changed from 0 to 1, to luminance of the conventional phosphor as unity (1), determined under electron beam excitation at a current density of 10 $\mu$A/cm$^2$. As in case of x=0.5, practically applicable high luminance was obtained in a range of $0.2 \leq z \leq 0.8$.

As shown above, phosphors having a good emission color, a high luminance, less luminance degradation and short decay time can be obtained according to the present invention.

EXAMPLE 2

A 7-inch green image projection tube with a film comprising a mixture of both the present phosphor and $Zn_{(2-x)}SiO_4:Mn_x$ phosphor as a green-emitting fluorescent film for image display was manufactured. Furthermore, a projection type television image display device was manufactured by combining the green image projection tube of the present invention with other blue image projection tube and red image projection tube.

Figure 10:
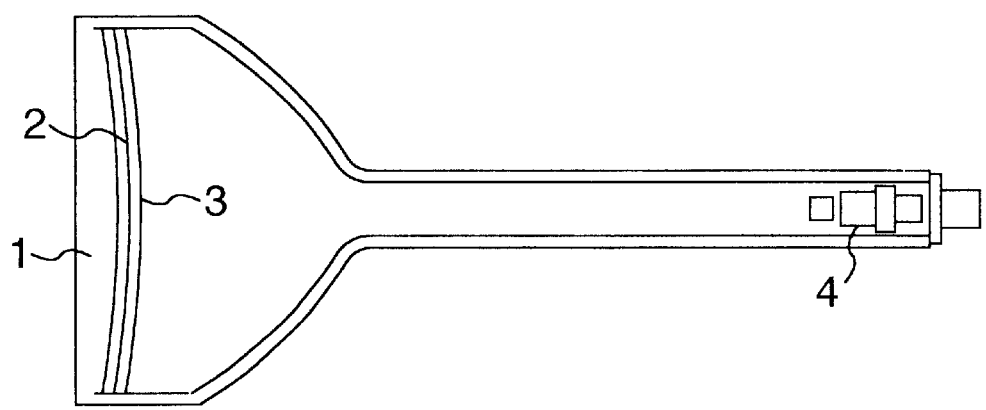
FIG. 10 is a conceptual view schematically showing the structure in cross-section of the present projection tube shown in Example 2.

FIG. 10 shows a conceptual view of the cross-section of a projection tube, where the projection tube has electron gun 4 at the neck end and fluorescent film 2 and metal back 3 on the inside surface of face plate 1. The fluorescent film of the projection tube is composed of a monochromatic film. Fluorescent film 2 is formed by sedimentation in water in a 7-inch bulb by means of the present invention, followed by filming, aluminum back vapor deposition, mounting of such parts as electron gun, etc., evacuation and sealing, thereby completing the projection tube.

Figure 11:
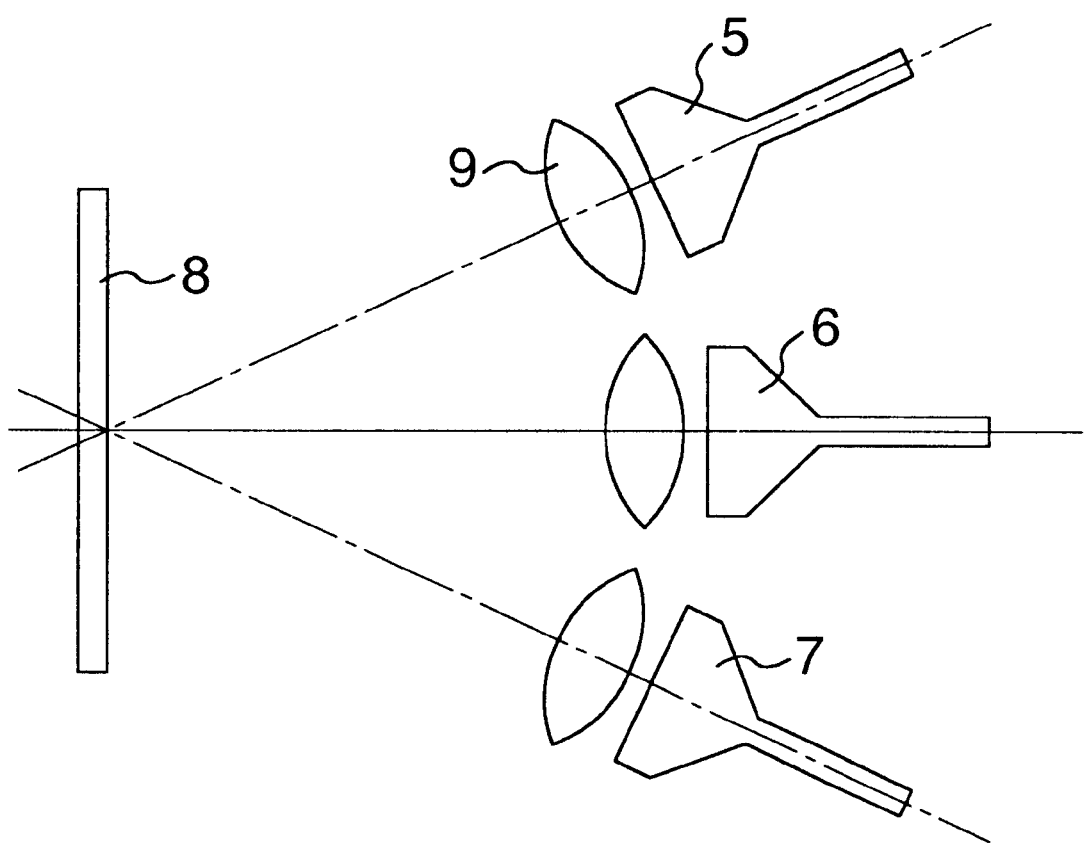
FIG. 11 is a schematic cross-sectional structural view of the present projection-type television image device shown in Example 2.

FIG. 11 shows a schematic view of a projection type television image display device according to the present invention, where numeral 5 is a red image projection tube, 6 a green image projection tube according to the present invention and 7 a blue image projection tube, and projection screen 8 is arranged at a position opposite to and far from these projection tube by a predetermined distance. The individual projection tubes are provided with projection lens systems 9 along the same lines as center axes of the projection tube, respectively, and monochromatic images reproduced on the face plates of the individual projection tubes are magnified and projected onto projection screen 8 to produce a three colors-overlapped, synthesized color image.

Actually, the projection type television display device comprises, besides the aforementioned individual image projection tubes, projection screen and projection lens system, such image display devices as television tuner, projection tube-driving circuit, image signal processing circuit, etc., such acoustic devices as acoustic speakers, amplifiers, etc., such operating devices as switches, volumes etc.; an outer casing for housing the entirety; a supporting frame, base, etc.

In this Example, emission properties were determined according to the following procedures. Luminance was measured by a luminance meter at a position placed by 30 cm far from a sample, and expressed as a relative luminance to the luminance of so far used standard sample still now in active use as 1.00.

Color emission of a phosphor was measured by a chromaticity, placed at a position by 30 cm far from a sample. Comparison of color emission was made by comparison of color y of CIE x-y color diagram.

The foregoing properties were all determined under excitation by irradiation with a 0.35 mA cathode ray in size of 102 mm×76 mm.

Luminance degradation resistance was determined by continuous irradiation with a 0.6 mA cathode ray in size of 102 mm×76 mm for 2,000 hours and compared in luminance ratio of the emission luminance thereafter to the emission luminance therebefore.

Afterglow time was determined according to the following procedure given in EIAJ code. A fluorescent film was excited by intermittent irradiation with an electron beam, while applying thereto pulses as signals to a cathode ray tube in such a state that the electron beam may not be deflected, i.e. in such a state that the cathode ray may be focussed to one point, where changes in emission from the fluorescent film were measured in time course and the state of luminance attenuation from the time when the irradiation was discontinued was investigated. Time when the luminance reached one tenth of the luminance of emission generated by the irradiation with the electron beam was defined as decay time $\tau_{10\%}$, expressing an decay time.

The projection type television image display device manufactured in this Example showed a green color y by 0.01 higher than that of the conventional device, a luminance degradation resistance by about 5% higher than that of the conventional device, a satisfactory luminance property and a green decay time by 0.5 ms shorter than $\tau_{10\%}$=7 ms of the conventional device.

As described above, a projection tube and an image display device, both with a good image quality, could be manufactured in this Example.

EXAMPLE 3

$Y_2O_3$, $Gd_2O_3$, $Tb_4O_7$, $Al_2O_3$ and $Ga_2O_3$ were used as raw materials for preparing a phosphor. Predetermined amounts of these raw materials according to stoichiometric ratios thereof were admixed with $BaF_2$ or $K_2SO_4$ as a flux for firing in a range of 1/100 to 1 mole per mole of the fired product of the raw materials, followed by thorough mixing in a mortar. The resulting mixture was placed in an aluminum crucible, and, after placing of a lid on the crucible, the mixture was fired at 1,600° C. for two hours. The resulting fired product was pulverized, washed with water to remove the flux component therefrom, and dried, whereby phosphor powders having particle sizes of about 8 μm were obtained.

In this manner, a green-emitting phosphor having a composition formula represented by $(Y_{1-x}Gd_x)_{3-3y}Tb_{3y}(Al_{1-z}Ga_z)_5O_{12}$ was obtained, where $0<x\leq 1$, $0<y<1$ and $0\leq z\leq 1$. The comparison, the conventional phosphor with x=0 was prepared.

Figure 12:
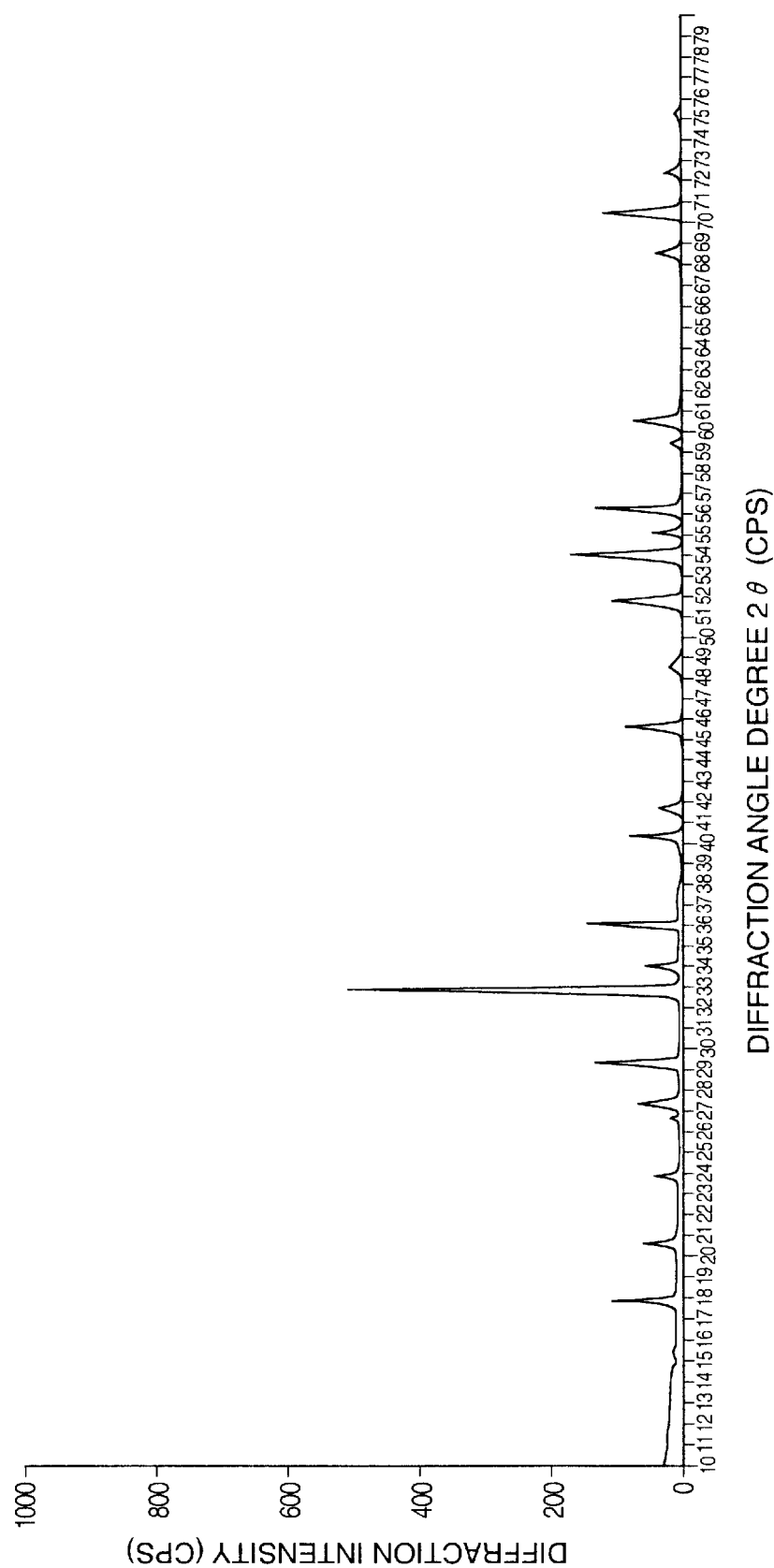
FIG. 12 is a diagram showing an X-ray diffraction pattern of the conventional phosphor prepared by using $BaF_2$ as a flux shown in Example 3.

FIG. 12 shows a pattern of diffraction intensity of a phosphor with x=1, y=0.07 and z=0.4 when $BaF_2$ was used as a flux, measured by Kα characteristic X-ray of Cu.

Figure 13:
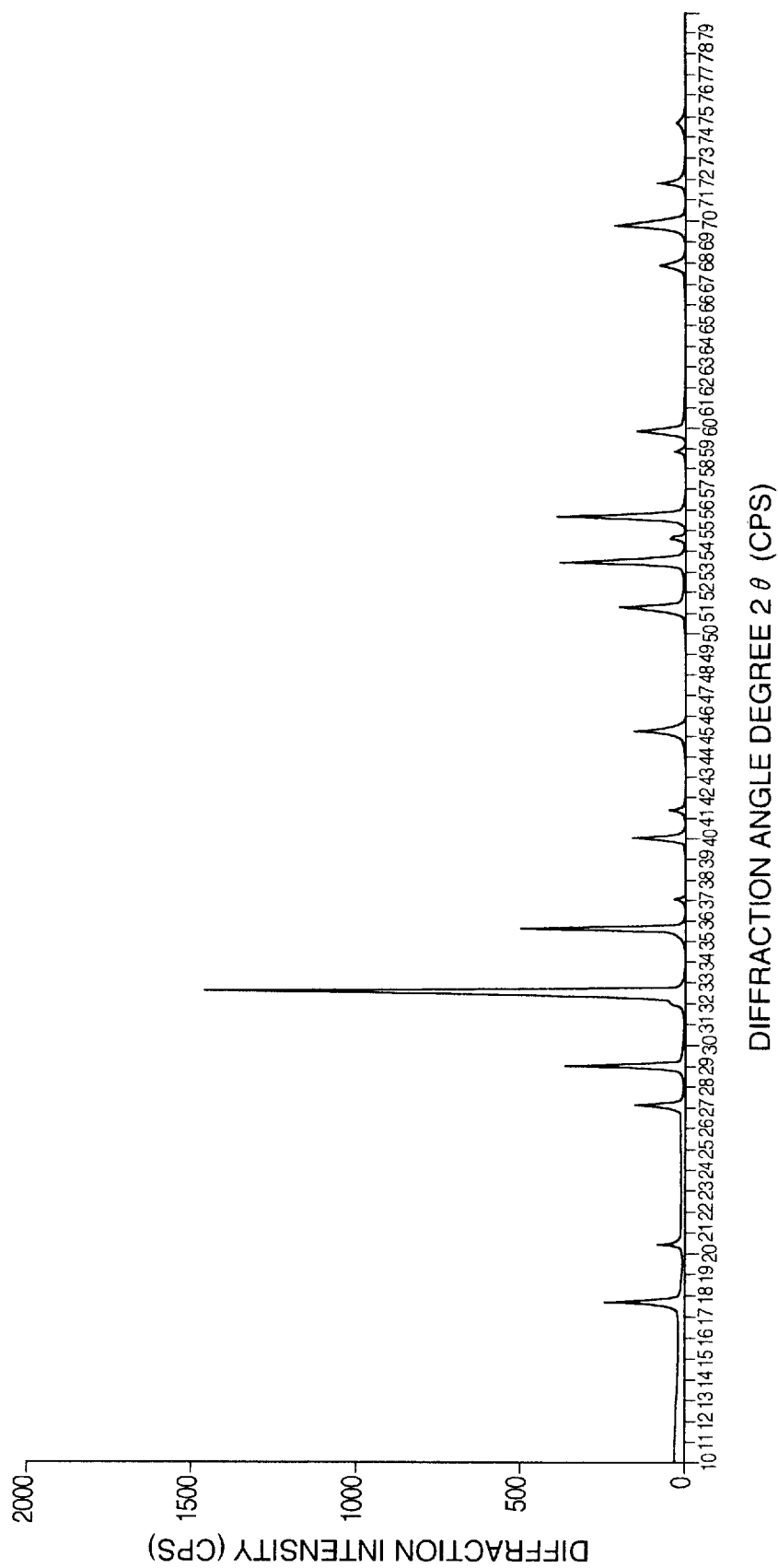
FIG. 13 is a diagram showing an X-ray diffraction pattern of the present phosphor prepared by using $K_2SO_4$ as a flux shown in Example 3.

FIG. 13 shows a pattern of diffraction intensity of a phosphor with x=1, y=0.07 and z=0 when $K_2SO_4$ was used as a flux, measured by Kα characteristic X-ray of Cu.

In FIG. 12, a diffraction ray of $GdAlO_3$ appears as a secondary phase in case of using $BaF_2$, whereas in FIG. 13 no such a diffraction ray of Gd $AlO_3$ appears in case of using $K_2SO_4$, as is apparent from comparison of the diffraction ray in the (211) plane of $GdAlO_3$ with the diffraction ray in the (420) plane of $(Y_{1-x}Gd_x)_{3-3y}Tb_{3y}(Al_{1-z}Ga_z)_5O_{12}$. That is, in FIG. 12 the diffraction ray in the (211) plane of $GdAlO_3$ present at a position of 2θ=34.117° appears with about ⅙ of the intensity of the diffraction ray in the (420) plane of $(Y_{1-x}Gd_x)_{3-3y}Tb_{3y}(Al_{1-z}Ga_z)_5O_{12}$ present at a position of 2θ=33.232°. In FIG. 13, on the other hand, the diffraction ray in the (420) plane of $(Y_{1-x}Gd_x)_{3-3y}Tb_{3y}(Al_{1-z}Ga_z)_5O_{12}$ present at a position of 2θ=32.642 appears with substantially the same intensity as in FIG. 12, but the diffraction ray in the plane (211) plane of $GdAlO_3$ does not appear at a measurable intensity, became no $GdAlO_3$ as a secondary phase is formed by using $K_2SO_4$, showing that a phosphor of good crystallinity was obtained. This is one factor of showing that the present phosphor has good properties.

As a result of investigation of other compositions, it was found that in the crystal of this Example, the diffraction ray in the (211) plane of $GdAlO_3$ has a smaller intensity than, ⅙ of that of the diffraction ray in the (420) plane of $(Y_{1-x}Gd_x)_{3-3y}Tb_{3y}(Al_{1-z}Ga_z)_5O_{12}$. For practical luminance, it is preferable that the diffraction ray in the (211) plane of $GdAlO_3$ has an intensity of not more than 1/10 of that of the diffraction ray in the (420) plane of $(Y_{1-x}Gd_x)_{3-3y}Tb_{3y}(Al_{1-z}Ga_z)_5O_{12}$. It was found effective that the concentration of $K_2SO_4$ as a flux was 1/100 to 1 mole per mole of the fired product.

EXAMPLE 4

$Y_2O_3$, $Gd_2O_3$, $TbO_7$, $Al_2O_3$ and $Ga_2O_3$ were used as raw materials for preparing a phosphor and further $Sc_2O_3$ was used as an additional raw material. Predetermined amounts of these raw materials according to stoichiometric ratios thereof were admixed with 1/20 mole of $K_2SO_4$ as a flux for firing per mole of the fired product of the raw materials, followed by thorough mixing in a mortar. The resulting mixture was placed in an aluminum crucible and, after placing of a lid on the crucible, the mixture was fired at 1,600° C. for two hours. The resulting fired product was pulverized, washed with water to remove the flux compound therefrom, and dried, whereby phosphor powders having particle sizes of about 8 μm were obtained.

In this manner, a green-emitting phosphor having a composition formula represented by $(Y_{1-x-a}Gd_xM_a)_{3-3y}Tb_{3y}(Al_{1-z}Ga_z)_5O_{12}$, where M was Sc, was prepared, where $0<x\leq 1$, $0\leq a<1$, $0<x+a\leq 1$, $0<y$ 1 and $0\leq z\leq 1$. For comparison, the conventional phosphor with x=0 was also prepared.

Figure 14:
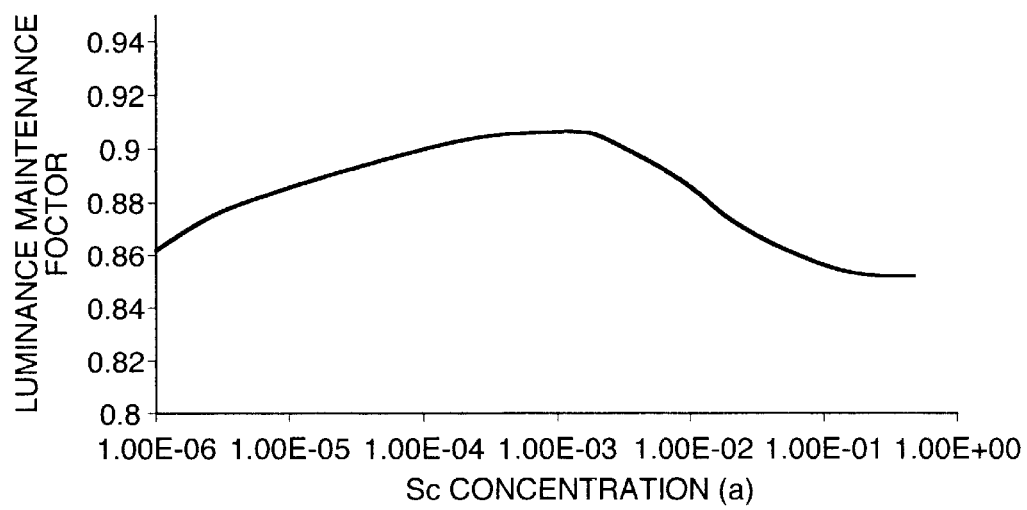
FIG. 14 is a diagram showing dependency of luminance maintenance factor on Sc concentration in the present Sc-containing phosphors shown in Example 4.

FIG. 14 shows changes in luminance maintenance factor of phosphor with x=1, y=0.07 and z=0.4, when Sc concentration a was changed from $1\times 10^{-6}$ to $5\times 10^{-1}$. Temperature of a phosphor sample was elevated to 350° C., followed by irradiation with an electron beam at a high current density (1,250 μA/cm²), which was several tens times as high as that practically in active use. A ratio of the emission luminance after holding the phosphor sample in that state for 30 minutes to the initial luminance was defined as a luminance maintenance factor, which was used as an evaluation standard for luminance degradation. The higher the luminance maintenance factor, the less the luminance degradation. That is, it can be said that the phosphor has a good luminance degradation resistance.

As is apparent from FIG. 14, the luminance maintenance factor is 0.85 when no Sc is added, but is increased up to 0.90 by addition of an appropriate amount of Sc. Thus, this Example showing Sc addition has a good luminance degradation resistance and an image display device with less degradation can be manufactured. In FIG. 14, "1, 00E-06" given on the axis of abscissa means $1 \times 16^{-6}$, "1, 00E-05" means $1 \times 10^{-5}$, and so forth.

EXAMPLE 5

$Y_2O_3$, $Gd_2O_3$, $Tb_4O_7$, $Al_2O_3$ and $Ga_2O_3$ were used as raw materials for preparing a phosphor and further $La_2O_3$ was used as an additional raw material. Predetermined amounts of these raw materials according to stoichiometric ratios thereof were admixed with 1/20 mole of $K_2SO_4$ as a flux for firing per mole of the fired product of the raw materials, followed by thorough mixing in a mortar. The resulting mixture was placed in an aluminum crucible and, after placing of a lid on the crucible, the mixture was fired at 1,600° C. for two hours. The resulting fired product was pulverized, washed with water to remove the flux component therefrom, and dried, whereby phosphor powders having particle sizes of about 8 μm were obtained.

In this manner, a green-emitting phosphor having a composition formula represented by $(Y_{1-x-a}Gd_xM_a)_{3-3y}Tb_{3y}(Al_{1-z}Ga_z)_5P_{12}$, where M is La, was prepared, where $0 < x \leq 1$, $0 \leq a < 1$, $0 < x+a \leq 1$, $0 < y\ 1$ and $0 \leq z < 1$. For comparison, the conventional phosphor with x=0 was also prepared.

Figure 15:
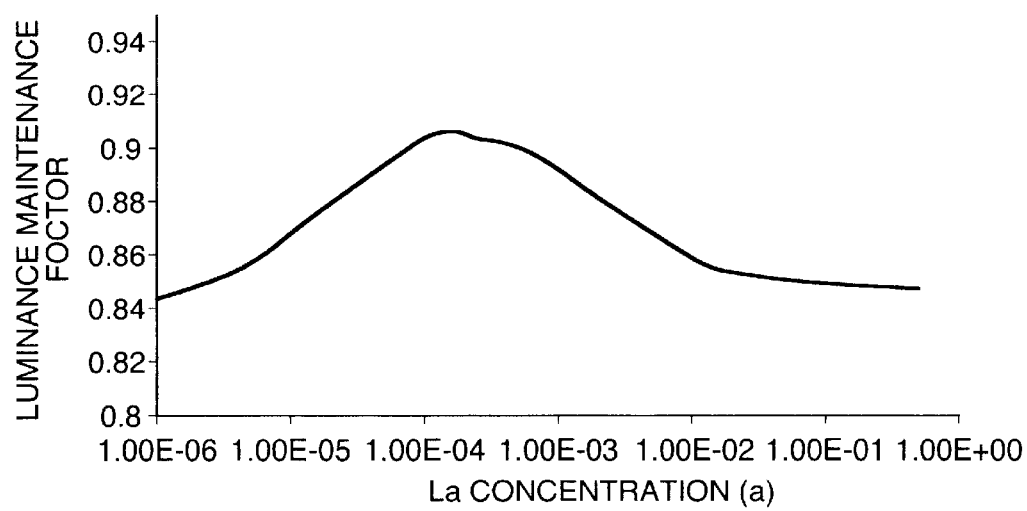
FIG. 15 is a diagram showing dependency of luminance maintenance factor on La concentration in the present La-containing phosphors shown in Example 5.

FIG. 15 shows changes in luminance maintenance factor of phosphor with x=1, y=0.07 and z=0.4, when La concentration a was changed from $1 \times 10^{-6}$ to $5 \times 10^{-1}$. Temperature of a phosphor sample was elevated to 350° C., followed by irradiation with an electron beam at a high current density (1,250 μA/cm$^2$), which was several tens times as high as that practically in active use. A ratio of the emission luminance after holding the phosphor sample in that state for 30 minutes to the initial luminance was defined as a luminance maintenance factor, which was used as an evaluation standard for luminance degradation. The higher the luminance maintenance factor, the less the luminance degradation. That is, it can be said that the phosphor has a good luminance degradation resistance.

As is apparent from FIG. 15, the luminance maintenance factor is 0.85 when no La is contained, but is increased up to 0.90 by addition of an appropriate amount of La. Thus, the present Example showing La addition has a good luminance degradation resistance and an image display device with less luminance degradation can be manufactured.

EXAMPLE 6

$Y_2O_3$, $Gd_2O_3$, $Tb_4O_7$, $Al_2O_3$ and $Ga_2O_3$ were used as raw materials for preparing a phosphor and further $Yb_2O_3$ was used as an additional raw material. Predetermined amounts of these raw materials according to stoichiometric ratios thereof were admixed with 1/20 mole of $K_2SO_4$ as a flux for firing per mole of the fired product of the raw materials, followed by thorough mixing in a mortar. The resulting mixture was placed in an aluminum crucible and, after placing of a lid on the crucible, the mixture was fired at 1,600° C. for two hours. The resulting fired product was pulverized, washed with water to remove the flux component therefrom, and dried, whereby phosphor powders having particle sizes of about 8 μm were obtained.

In this manner, a green-emitting phosphor having a composition formula represented by $(Y_{1-x-a}Gd_xM_a)_{3-3y}Tb_{3y}(Al_{1-z}Ga_z)_5O_{12}$, where M is Yb, was prepared, where $0 < x \leq 1$, $0 \leq a < 1$, $0 < x+a \leq 1$, $0 < y < 1$ and $0 \leq z \leq 1$. For comparison, the conventional phosphor with x=0 was also prepared.

Figure 16:
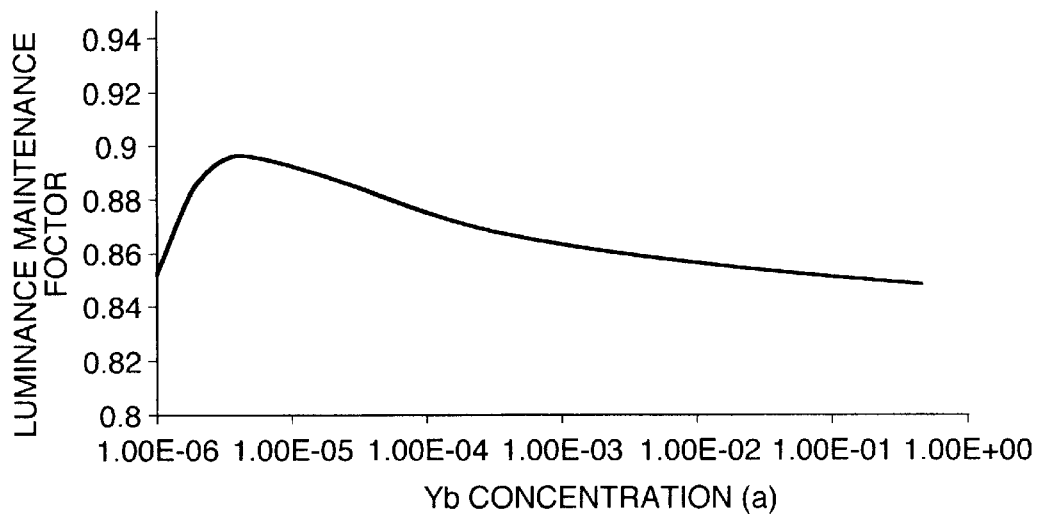
FIG. 16 is a diagram showing dependency of luminance maintenance factor on Yb concentration in the present Yb-containing phosphors shown in Example 6.

FIG. 16 shows changes in luminance maintenance factor of phosphor with x=1, y=0.07 and z=0.4, when Yb concentration a was changed from $1 \times 10^{-6}$ to $5 \times 10^{-1}$. Temperature of a phosphor sample was elevated to 350° C., followed by irradiation with an electron beam at a high current density (1,250 μM/cm$^2$), which was several tens times as high as that practically in active use. A ratio of the emission luminance after holding the phosphor sample in that state for 30 minutes to the initial luminance was defined as a luminance maintenance factor, which was used as an evaluation standard for luminance degradation. The higher the luminance maintenance factor, the less the luminance degradation. That is, it can be said that the phosphor has a good luminance degradation resistance.

As is apparent from FIG. 16, the luminance maintenance factor is 0.85 when no Yb is contained, but is increased up to 0.90 by addition of an appropriate amount of Yb. Thus, the present Example showing Yb addition has a good luminance degradation resistance and an image display device with less luminance degradation can be manufactured.

In Examples 4 to 6, one of Sc, Yb and La was used for M, but a plurality of these elements can be used.

EXAMPLE 7

A 7-inch green image projection tube with a film comprising a mixture of at least one of the present phosphors shown in Examples 1, 4, 5 and 6, and a $Zn_{(2-x)}SiO_4$:Mn phosphor as a green-emitting fluorescent film for image display was manufactured. Furthermore, a projection type television image display device was manufactured by combining the green image projection tube of the present invention with other blue image projection tube and red image projection tube. Structures of the devices and procedures for determining properties thereof were the same as in Example 2.

Figure 17:
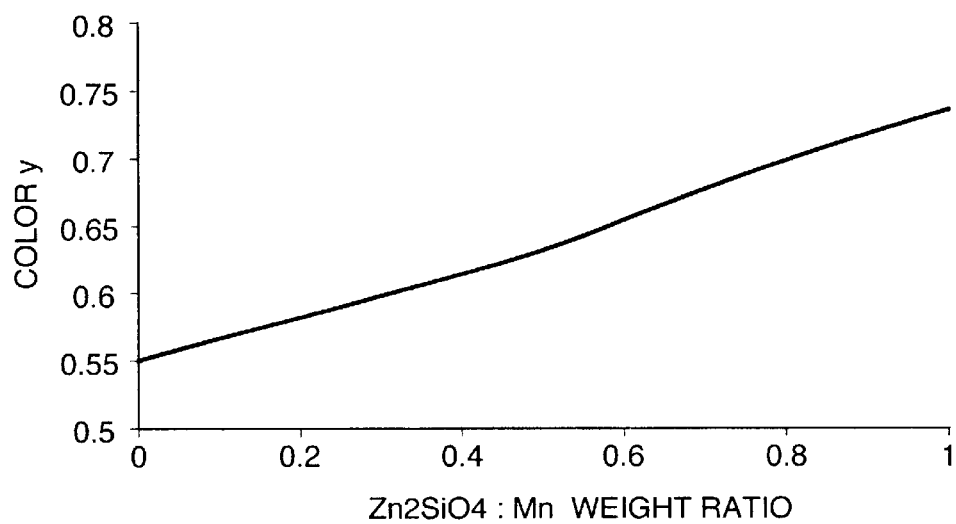
FIG. 17 is a diagram showing dependency of color y on weight ratio of $Zn_2SiO_5$:Mn phosphors in the present mixed phosphors shown in Example 17.
Figure 18:
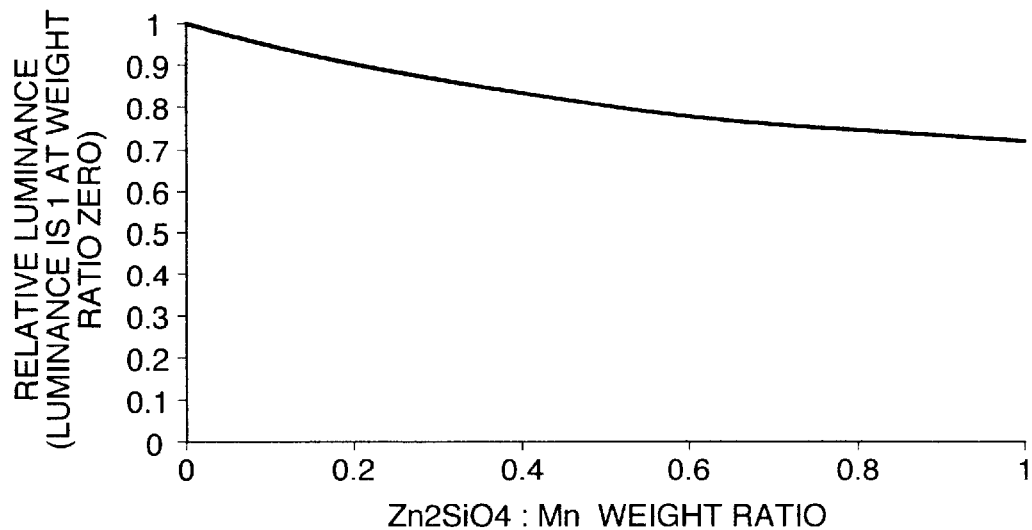
FIG. 18 is a diagram showing dependency of relative luminance on weight ratio of $Zn_2SiO_5$:Mn phosphor in the present mixed phosphors shown in Example 7.

Color y and relative luminance of the film comprising the above-mentioned mixture according to the present invention were determined by changing a weight ratio of the $Zn_{(2-x)}SiO_4$:$Mn_x$ phosphor to the present phosphor from 0 to 1. FIG. 17 shows changes in color y against weight ratio of the $Zn_{(2-x)}SiO_4$:$Mn_x$ phosphor. FIG. 18 shows changes in relative luminance in case of 10 μA electron beam excitation against weight ratio of the $Zn_{(2-x)}SiO_4$:Mn phosphor.

As is apparent from FIG. 17, color y is increased with increasing weight ratio of $Zn_{(2-x)}SiO_4$:$Mn_x$, showing a good color reproducibility. However, as is apparent from FIG. 18, the relative luminance is decreased with increasing weight ratio of $Zn_{(2-x)}SiO_4$:$Mn_x$. the higher the weight ratio of $Zn_{(2-x)}SiO_4$:$Mn_x$, the better the color reproducibility, but a weight ratio of not more than 0.4 is preferable for obtaining a practical relative luminance. An image display device with good properties can be manufactured by using the mixed phosphors in the aforementioned range.

EXAMPLE 8

A 7-inch green image projection tube with a film comprising a mixture of at least one of the present phosphors shown in Examples 1, 4, 5 and 6 and a $Y_2SiO_5$:Tb phosphor as a green-emitting fluorescent film for image display was manufactured. Furthermore, a projection type television image display device was manufactured by combining the green image projection tube of the present invention with other blue image projection tube and red image projection tube. Structure of the device and procedures for determining properties thereof were the same as in Example 2.

Color y and relative luminance of the film comprising the above-mentioned mixture according to the present invention were determined by changing a weight ratio of the $Y_2SiO_5$:Tb phosphor to the present phosphor from 0 to 1. Substantially the same results as in Example 8 were obtained.

EXAMPLE 9

A 7-inch green image projection tube with a film comprising a mixture of at least one of the present phosphor shown in Examples 1, 4, 5 and 6 and an LaOCl:Tb phosphor as a green-emitting fluorescent film for image display was manufactured. Furthermore, a projection type television image display device was manufactured by combining the green image projection tube of the present invention with other blue image projection tube and red image projection tube. Structures of the devices and procedures for determining properties thereof were the same as in Example 2.

Color y and relative luminance of the film comprising the above-mentioned mixture according to the present invention were determined by changing a weight ratio of the LaOCl:Tb phosphor to the present phosphor from 0 to 1. Substantially the same results as in Example 8 were obtained.

EXAMPLE 10

A 7-inch green image projection tube with a film comprising a mixture of at least one of the present phosphors shown in Examples 1, 4, 5 and 6 and an $InBO_3$:Tb phosphor as a green-emitting fluorescent film for image display was manufactured. Furthermore, a projection type television image display device was manufactured by combining the green image projection tube of the present invention with other blue image projection tube and red image projection tube. Structures of the devices and procedures for determining properties thereof were the same as in Example 2.

Color y and relative luminance of the film comprising the above-mentioned mixture according to the present invention were determined by changing a weight ratio of the $InBO_3$:Tb phosphor to the present phosphor from 0 to 1. Substantially the same results as in Example 8 were obtained.

EXAMPLE 11

Figure 19:
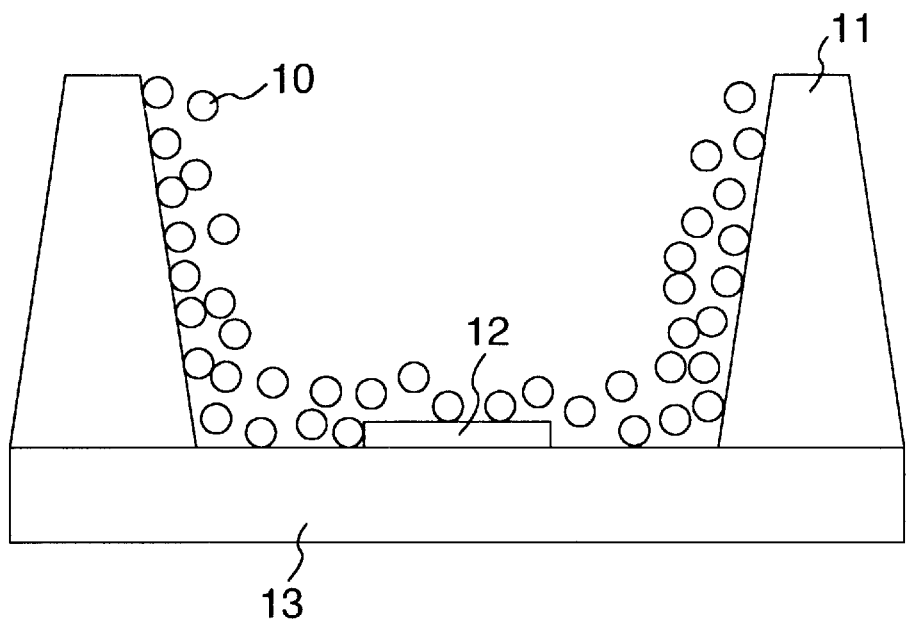
FIG. 19 schematically shows the cell structure in cross-section of the present plasma display panel shown in Example 11.
Figure 20:
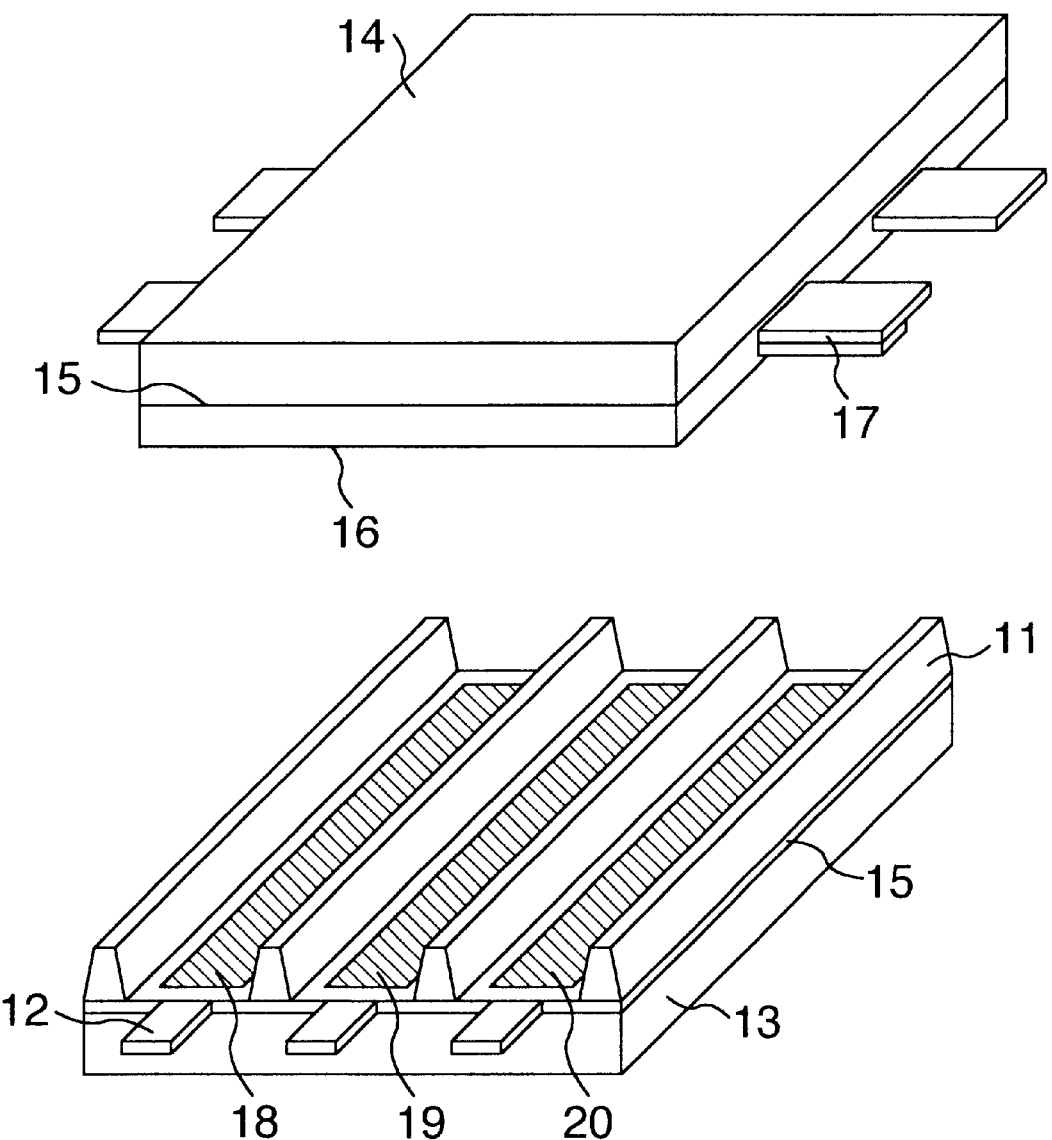
FIG. 20 schematically shows structure of the plasma display panel shown in Example 11.

A fluorescent film containing the present phosphor was applied to a plasma display panel (PDP). FIG. 19 show the cell structure of a plasma display panel, and FIG. 20 shows the structure of the plasma display panel.

Results of determining emission properties of the panel by changing a Gd concentration x of the present phosphor are shown in Table 1. A plasma display panel with a better green emission, a longer life, a shorter decay time and a better image quality than those of the conventional one with x=0 could be manufactured.

TABLE 1

| Composition | Relative luminance (luminance at x = 0 is made 1.00) | Color y | Decay time (ms) | Luminance maintenance factor (after forced degradation) |
|---|---|---|---|---|
| Gd Concentration x = 0 | 1.00 | 0.531 | 5.8 | 0.70 |
| Gd Concentration x = 0.2 | 1.01 | 0.533 | 5.6 | 0.76 |
| Gd Concentration x = 0.4 | 0.95 | 0.533 | 5.4 | 0.81 |
| Gd Concentration x = 0.6 | 0.96 | 0.533 | 5.3 | 0.80 |
| Gd Concentration x = 0.8 | 0.95 | 0.534 | 5.2 | 0.84 |
| Gd Concentration x = 1 | 0.94 | 0.534 | 5.0 | 0.85 |

EXAMPLE 12

Figure 21:
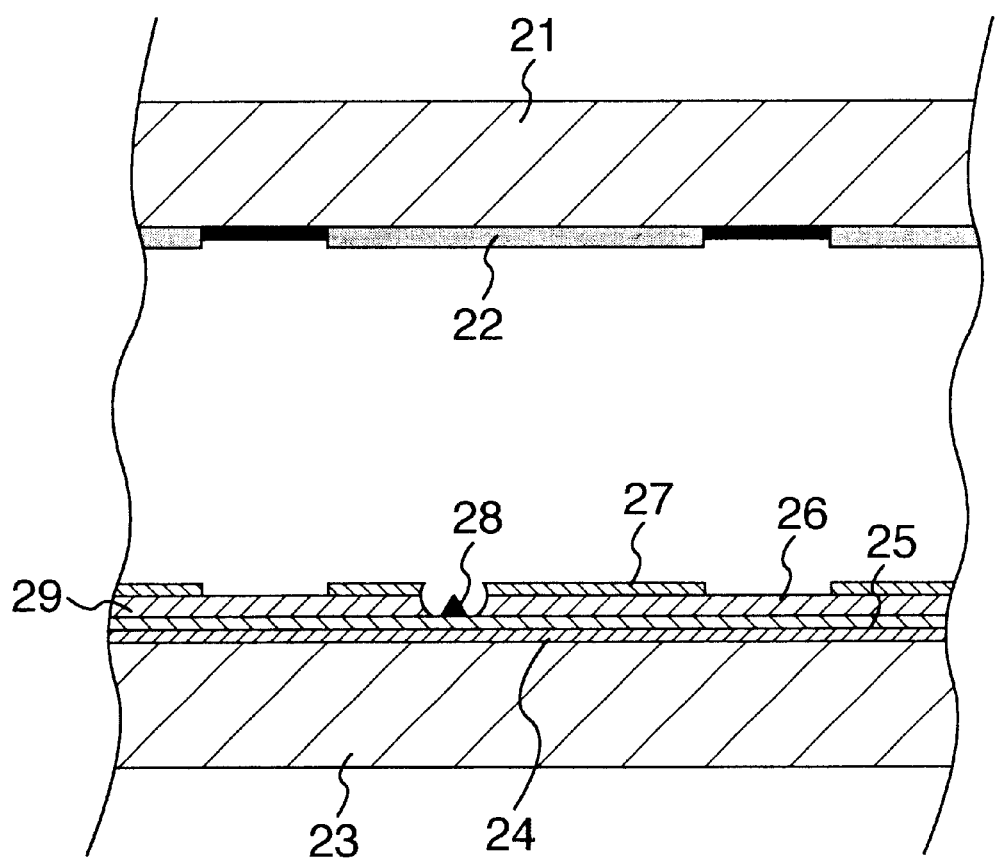
FIG. 21 schematically shows the cell structure in cross-section of the present field emitter display panel shown in Example 12.

A fluorescent film containing the present phosphor was applied to a field emitter display (FED) to be excited by a low speed electron beam. FIG. 21 shows the cell structure of a field emitter display.

As a result of determining emission properties of the panel by changing a Gd concentration x of the present phosphor, it was found that the same results as in Example 12 could be obtained. A field emitter display with a better green emission, a longer life, a shorter decay time and a better image quality than those of the conventional one with x=0 could be manufactured.

According to the present invention, phosphors suitable for high-image quality display and an image display device with a high image quality can be obtained.

What is claimed is:

1. A green-emitting phosphor having a composition formula represented by:

$(Y_{1-x-a}Gd_xM_a)_{3-3y}Tb_{3y}(Al_{1-z}Ga_z)_5O_{12}$, where $0<x\leq1$, $0\leq a<1$, $0<x+a\leq1$, $0.03\leq y\leq0.3$ and $0<z<1$, and M is at least one of Sc, Yb and La, and a diffraction ray in the (211) plane of $GdAlO_3$ has an intensity of not more than 1/10 of that of the diffraction ray in the (420) plane of the green-emitting phosphor according to X-ray diffraction intensity measurement using κα characteristic X-ray of Cu, and wherein the phosphor further includes at least one element selected from the group consisting of potassium, sodium, strontium, magnesium, calcium and barium.

2. A green-emitting phosphor according to claim 1, wherein potassium sulfate is added to the green-emitting phosphor as a flux in the course of the preparation of the green-emitting phosphor.

3. A green-emitting phosphor according to claim 1, wherein color y in CIE x-y color diagram of emission color is by at least 0.0005 higher than color y of emission color of $Y_{3-3y}Tb_{3y}(Al_{1-z}Ga_z)O_{12}(0<y<1$ and $0\leq z \leq 1)$.

4. A green-emitting phosphor according to claim 1, wherein Time until the luminance of afterglow after discontinuation of intermittent electron beam excitation is attenuated to one tenth of the luminance during the electron beam excitation is not more than 6.7 ms.

5. An image display device having a cathode ray tube provided with a face plate with a fluorescent film formed thereon and an emitting means upon irradiation of the fluorescent film with an electron beam, wherein the fluorescent film contains the phosphor according to claim 4.

6. An image display device according to claim 5, wherein the cathode ray tube is a projection type.

7. A green-emitting phosphor according to claim 1, wherein x is in a range of $0.1 \leq x \leq 1$.

8. An image display device having a cathode ray tube provided with a face plate with a fluorescent film formed thereon and an emitting means upon irradiation of the fluorescent film with an electron beam, wherein the fluorescent film contains the phosphor according to claim 7.

9. An image display device according to claim 8, wherein the cathode ray tube is a projection type.

10. A green-emitting phosphor according to claim 1, wherein z is in a range of $0.02 \leq z \leq 0.8$.

11. A green-emitting phosphor according to claim 1, wherein a is in a range of $1 \times 10^{-6} \leq a \leq 5 \times 10^{-1}$.

12. A green-emitting phosphor according to claim 1, wherein at least one member selected from the group consisting of $Zn_2SiO_4$: Mn, $Y_2SiO_5$: Tb, LaOCl:Tb and $InBO_3$: Tb is further added.

13. An image display device having a cathode ray tube provided with a face plate with a fluorescent film formed thereon and an emitting means upon irradiation of the fluorescent film with an electron beam, wherein the fluorescent film contains the phosphors according to claim 12.

14. An image display device according to claim 13, wherein the cathode ray tube is a projection type.

15. A green-emitting phosphor according to claim 12, wherein a mixing ratio of said at least one member that is further added is not more than 40 wt. %.

16. An image display device having a cathode ray tube provided with a face plate with a fluorescent film formed thereon and an emitting means upon irradiation of the fluorescent film with an electron beam, wherein the fluorescent film contains the phosphor according to claim 1.

17. An image display device according to claim 16, wherein the cathode ray tube is a projection type.

18. An image display device having a plasma display panel provided with a fluorescent film and an emitting means upon irradiation of the fluorescent film with an ultraviolet ray, wherein the fluorescent film contains the phosphor according to claim 1.

19. An image display device having a low speed electron beam display panel provided with a fluorescent film and an emitting means upon irradiation of the fluorescent film with a low speed electron beam at an acceleration voltage of not more than 15 kV, wherein the fluorescent film contains the phosphor according to claim 1.

20. A green-emitting phosphor according to claim 1, wherein $0.5 \leq x \leq 1$.

21. A green-emitting phosphor having a composition formula represented by:

$(Y_{1-x-a}Gd_xM_a)_{3-3y}Tb_{3y}(Al_{1-z}Ga_z)_5O_{12}$, wherein $0.5 \leq x \leq 1$, $0 \leq a < 1$, $0 < x+a \leq 1$, $0.03 \leq y \leq 0.3$, and $0.2 \leq z \leq 0.8$, and M is at least one of Sc, Yb and La, and wherein diffraction ray in the (211) plane of $GdAlO_3$ has an intensity of not more than 1/10 of that of the diffraction ray in the (420) plane of the green-emitting phosphor according to X-ray diffraction intensity measurement using $k\alpha$ characteristic X-ray of Cu, and wherein the phosphor further includes at least one element selected from the group consisting of potassium, sodium, strontium, magnesium, calcium and barium.

22. A green-emitting phosphor having a composition formula represented by:

$(Y_{1-x-a}Gd_xM_a)_{3-3y}Tb_{3y}(Al_{1-z}Ga_z)_5O_{12}$, wherein $0 < x \leq 1$, $0 \leq a < 1$, $0 < x+a \leq 1$, $0.03 \leq y \leq 0.3$, and $0 < z < 1$, and M is at least one of Sc, and La, and a diffraction ray in the (211) plane of $GdAlO_3$ has an intensity of not more than 1/10 of that of the diffraction ray in the (420) plane of the green-emitting phosphor according to x-ray diffraction intensity measurement using K characteristic x-ray of Cu, and wherein the phosphor further contains at least one element selected from the group consisting of potassium, sodium, strontium, magnesium, calcium and barium.

* * * * *